Sept. 6, 1960 F. M. DEMER ET AL 2,952,010

MAGNETIC RECORDING AND REPRODUCING SYSTEM

Filed Dec. 30, 1957 6 Sheets-Sheet 1

INVENTORS.
FREDERICK M. DEMER
WILLIAM W. DODGE
BY NORMAN S. STOCKDALE

G. R. Gugger
AGENT

Sept. 6, 1960 F. M. DEMER ET AL 2,952,010

MAGNETIC RECORDING AND REPRODUCING SYSTEM

Filed Dec. 30, 1957 6 Sheets-Sheet 2

Sept. 6, 1960 F. M. DEMER ET AL 2,952,010

MAGNETIC RECORDING AND REPRODUCING SYSTEM

Filed Dec. 30, 1957 6 Sheets-Sheet 4

United States Patent Office 2,952,010
Patented Sept. 6, 1960

2,952,010

MAGNETIC RECORDING AND REPRODUCING SYSTEM

Frederick M. Demer, Johnson City, and William W. Dodge and Norman S. Stockdale, Binghamton, N.Y., assignors to International Business Machines Corporation, New York, N.Y., a corporation of New York Filed Dec. 30, 1957, Ser. No. 706,062

12 Claims. (Cl. 340—174.1)

Figure 1:
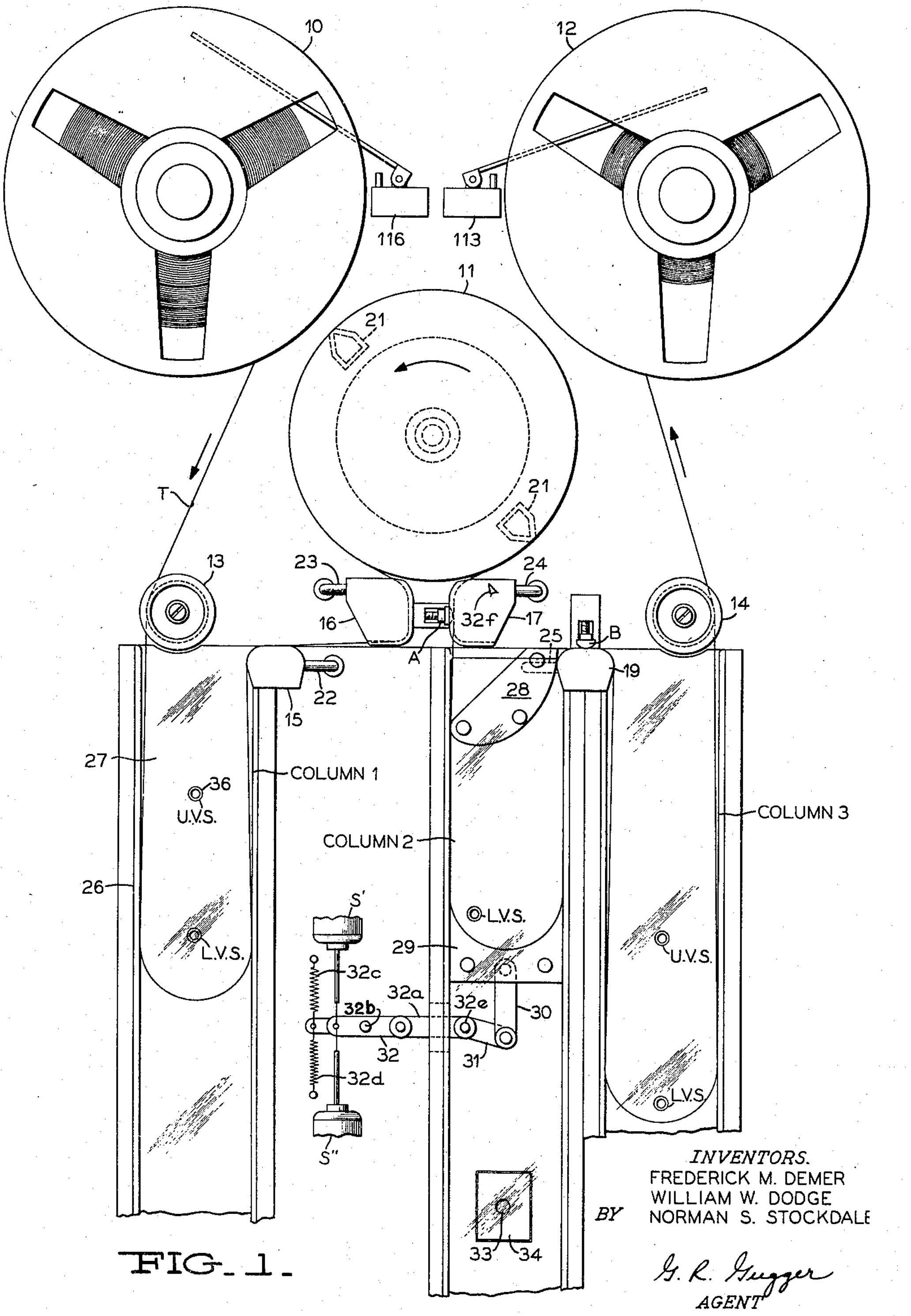

This invention relates to magnetic tape recording and reproducing systems and more particularly to an improved arrangement for positioning the movable record tape for recording and reproducing operations.

The conventional means for reading data from magnetic tape requires a relative motion between the tape and the reading head assembly and the present invention operates by holding the tape stationary and moving the assembly. In accordance with this invention, a record tape is utilized which is divided into a series of individual sections of predetermnied length. Each section is, in effect, a long group record and the individual item records within each section may be repeatedly scanned for checking or other purposes or they may be erased and re-written in place. The tape transport path leads from the feed reel around a rotating disc which carries a pair of magnetic heads and thence onto a take-up reel. The tape is stationary when under scan and succeeding sections of the tape are fed by vacuum control in a "slack" and a "measuring" pocket on opposite sides of the disc. The measuring pocket is adjustable and insures that each length of tape feed will be consistent and accurate. Suitable provisions are made to insure that the tape does not actually contact the surface of the rotating disc.

The present novel arrangement of tape transport employing the use of vacuum columns to produce tape motion and tape tension presents a number of advantages such as the fact that motion is imparted to no part other than the tape itself and the accelerating force is developed over a substantial area of the tape thus resulting in a positive fast acting clutching action. In addition, each length of tape feed will be precise due to the fact that it is measured by the capacity of the measuring pocket or column, which is adjustable for variable lengths of tape feed. Also, if the tape is held motionless and the disc rotated, the magnetic heads carried by the disc can repeatedly scan that section of the tape which is supported by the disc.

Accordingly, one of the principal objects of the present invention is to provide a magnetic tape recording and reproducing system wherein sections of magnetic tape are successively positioned at rest around a revolving magnetic head assembly for recording and reproducing operations.

A further object of the present invention is to provide a magnetic tape recording and reproducing system as in the foregoing object and including means for accurately measuring and controlling each section of tape to be fed.

A still further object of the present invention is to provide a magnetic tape recording and reproducing system wherein tape motion and tape tension are produced by vacuum columns and tape clamping means.

A still further object of the present invention is to provide a magnetic tape recording and reproducing system wherein the tape, during reading and writing operations, is stationary and under a fixed value of tension whereby the tape to magnetic head gap is maintained constant.

A still further object of the present invention is to provide a magnetic tape recording and reproducing system wherein motion is imparted to no part other than the tape and wherein the accelerating force is developed over a substantial area of the tape.

Another object of the present invention is to provide a magnetic tape recording and reproducing system wherein means are provided for holding the tape motionless around a rotating magnetic head assembly so that the section of the tape supported by said assembly may be repeatedly scanned.

Other objects of the invention will be pointed out in the following description and claims and illustrated in accompanying drawings, which disclose, by way of example, the principle of the invention and the best mode, which has been contemplated, of applying that principle.

In the drawings:

Fig. 1 is a diagrammatic view of the tape transport system.

Figs. 2*a*–2*e* comprise a circuit diagram of the system shown in Fig. 1.

Referring to Fig. 1, there is shown fixed on rotatable shafts a tape feed reel 10, a rotor assembly 11 and a tape take-up reel 12. The driving connections for the tape reel shafts and the rotor shaft are not shown herein, but it is understood that these shafts are suitably connected through clutches, shown diagrammatically in Fig. 2*c*, to be driven by reel drive, take-up, rewind and rotor motors shown diagrammatically in Fig. 2*a*.

A guide pulley 13, loosely mounted on a stud, is provided to guide a magnetic tape T as it feeds off from the feed reel 10 and a similar guide pulley 14, loosely mounted on a stud, is provided to guide the tape onto the take-up reel 12. In moving from the feed reel to the take-up reel, the tape will pass over a fixed guide 15, under and up around a fixed guide 16, around the rotor assembly 11, down between a fixed guide 17 and clamping member A, then between another fixed guide 19 and clamping member B, and on around the guide pulley 14. The clamping members A and B are pivotally mounted and normally allow for free movement of the tape. As will be seen later, upon energization of suitable coils the clamping members will be forced against the guides to prevent movement of the tape.

The magnetic recording on and reproduction from tape T takes place on the section of tape supported at rest around the rotating rotor 11 and for this purpose the rotor carries a pair of magnetic heads 21 positioned diametrically opposite each other so that, in effect, the average access time will be the time required for approximately one-quarter revolution of the rotor.

Figure 2A:
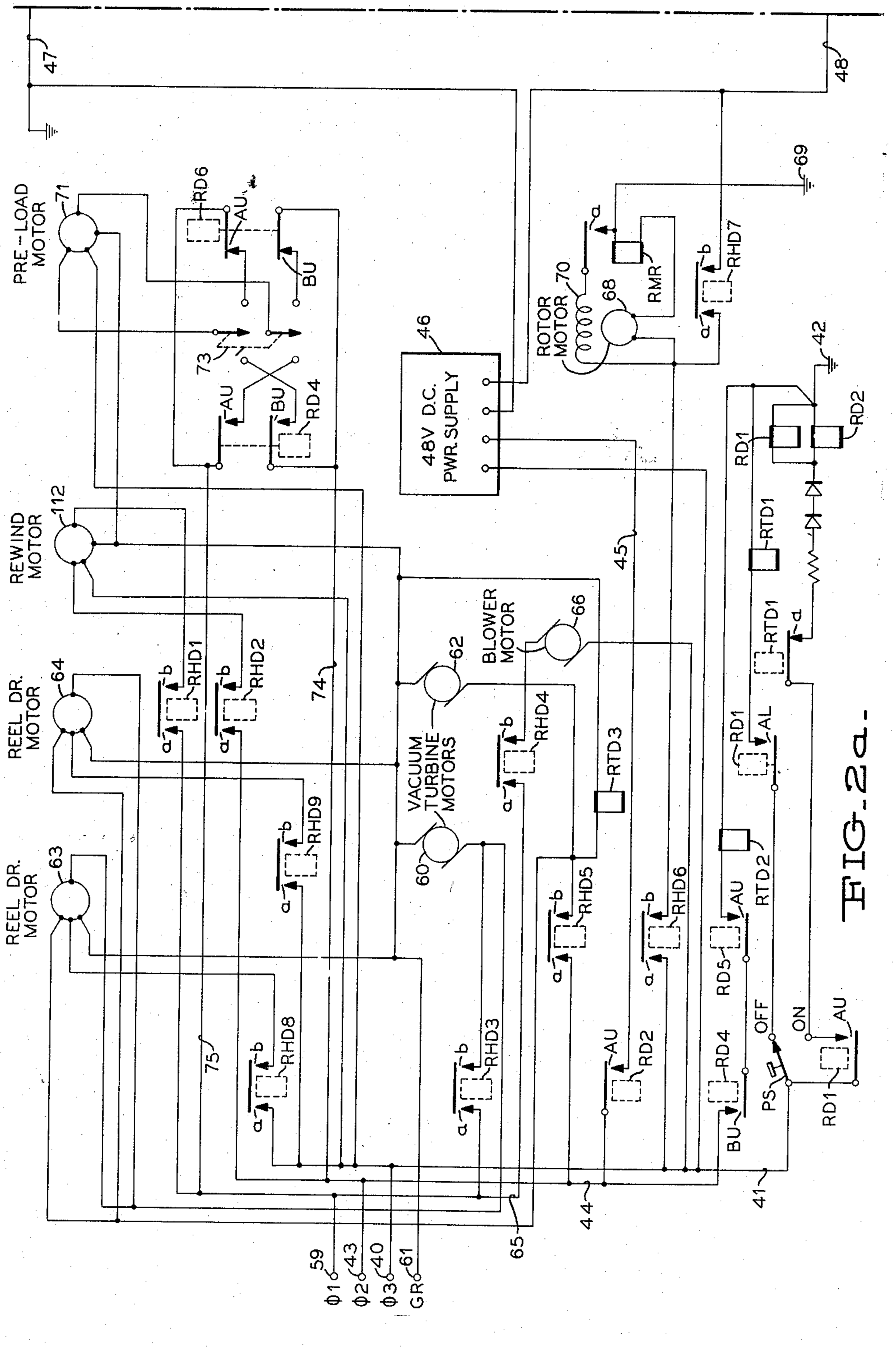

Air under pressure supplied from a blower motor, shown diagrammatically in Fig. 2*a*, is distributed via the conduits 22, 23, 24 and 25 to the fixed guides 15, 16, 17 and 19, respectively. The surface on each of these guides facing the tape is perforated to allow the air pressure to maintain the tape clear of the guide surface and thus eliminate wear which would normally be caused by friction between the tape and the guides. The surfaces on the guides 16 and 17 facing the tape are, in addition, curved to form flange members producing expansion of the air at the tape surface. As a result, the section of tape surrounding the rotor is separated from the rotor by a cushion of air. The physical dimension of the gap between the tape and rotor is a function primarily of the velocity of the rotor surface and the tension maintained in the tape. The tape is maintained in tension during reading and writing so that the gap, approximately .0003″, does not affect the efficiency of operation.

Positioned across the front of the machine are a series of channel members 26 arranged to form three tape columns or pockets which will hereinafter be referred to as tape columns 1, 2, and 3, reading from left to right. Each column has a glass window 27 in the front and is sealed on all sides except at the top of the column which is left open for entry of the tape T. The depth of each column from front to back is just enough to allow for free vertical movement of the tape loop within the column.

Fixed at the top of column 2 is an upper tape profile 28 which comprises a series of individual plates mounted on studs and separated from each other to expose the upper portion of column 2 to the atmosphere. A lower tape profile 29 is mounted near the bottom of column 2 and is similarly composed of individual plates mounted on studs and separated from each other in order that column 2 may be exposed to a source of vacuum. As will be understood, the upper and lower tape profiles form a measuring device for accurately measuring each increment of tape feed. The lower profile 29 may be mounted in suitable grooves in column 2 and adjusted vertically through the pivoted links 30, 31. It is preferred that the lower profile be adjusted automatically to take care of any variances of tape feed that may occur and this may be accomplished through a pair of solenoids S′ and S″ and the links 32 and 32*a*. The link 32, which is connected to the solenoid plungers, is pivoted on a stud 32*b* and is centered by means of springs 32*c*, 32*d*. Link 32 is also pivotally connected to the link 32*a* which in turn is fastened to a rotatable stud 32*e*, as is the link 31.

The position of the tape section around rotor 11 is detected by the read heads 21 and a suitable mark recorded at the beginning of each record section may be compared against a suitable timing pulse set up when a reading head passes an index position indicated at 32*f*. With rotor 11 revolving counterclockwise, the sensing of a section mark prior to the timing pulse indicates that the tape fed too far and a suitable circuit may be completed to solenoid S′ to raise the lower profile and thus shorten the increment of tape feed. Similarly, sensing of the section mark after the timing pulse occurs will effect energization of solenoid S″ to lower the profile and lengthen the increment of tape feed.

Although not shown in Fig. 1, suitable conduits are provided leading into the bottom of columns 1 and 3 for supplying vacuum to these columns whenever vacuum turbine motors, shown diagrammatically in Fig. 2*a*, are energized. Mounted at the lower end of column 2 is a suitable conduit 33 and valve 34. Valve 34 is controlled electrically to expose column 2 to vacuum supplied by the turbine motors or to atmospheric pressure.

The function of columns 1 and 3 is to control the drive clutches for the feed and take-up reels and control is exercised through upper and lower vacuum switches, designated U.V.S. and L.V.S., positioned in columns 1 and 3. Each vacuum switch comprises a suitable diaphragm connected to the column by a tube 36 and arranged to open and close related electrical contacts depending upon whether the column is exposed to vacuum or atmospheric pressure.

The function of column 2 is to provide a motive force for tape motion and to precisely limit the length of tape shifted to the rotor. For control purposes, column 2 has a lower vacuum switch L.V.S. positioned just above the lower tape profile 29.

The tape is preloaded prior to the start of operation by threading the tape from the feed reel around the pulley 13, across the top of column 1 and over guide 15, around guide 16 and the rotor 11, down between guide 17 and clamp A, around and up against the lower surface of the upper profile 28 in column 2, between guide 19 and clamp B, and around the pulley 14 on to the take-up reel 12. Clamps A and B are operative during the reading and writing period. Tension on the tape section around the rotor is maintained by a weak vacuum in column 1 acting against tape clamp A and the feed reel. A loop of tape will be formed in column 1 preparatory to a feeding operation. A tape feeding operation is started by the establishment of a strong vacuum in column 2. Tape clamp A is then released and the tape is drawn from column 1, around the rotor, and into column 2 by the strong vacuum in that column.

Column 2 is dimensioned so that the tape, when drawn against the sides and against the lower profile 29, will have been moved the proper length to replace the section around the rotor. Clamp A is then made operative and clamp B released following a tape shift. Concurrently, valve 34 is transferred cutting the vacuum off in column 2 and allowing the strong vacuum in column 3 to pull the tape from column 2 into column 3. The strong vacuum in column 3 removes the tape from column 2 and then clamp B is again operated. Read or write conditions are established after clamp A is energized and will function during the dump cycle when tape is dumped from column 2 into column 3.

A detailed description of the operation of the tape transport system will now be given with particular reference to the wiring diagram. All vacuum switches are shown in their normal atmospheric condition with the vacuum turbine motors off and no vacuum in the columns 1, 2, and 3.

Referring to Fig. 2*a*, closure of the power switch PS to the "on" position will complete a circuit from the phase 3 terminal 40 of the power source, wire 41, switch PS, normally closed contacts PTD1*a*, relay coils RD1 and RD2 to the ground connection 42. Relays RD1 and RD2 will hold through the RTD1*a* contacts and the now closed RD1AU contacts. Closure of contacts RD2AU now completes a circuit from the phase 2 terminal 43 and wire 44, 45 to a 48 volt D.C. supply 46 which furnishes a 48 volt D.C. voltage across the main lines 47, 48 of the machine.

With power on a circuit is completed from line 47 (Fig. 2*d*), wire 49 the normally closed side of column 2 L.V.S. contacts, wire 50, normally closed contacts RW8*a* (Fig. 2*c*), capacitor 51 and the pick coil of clamp A delay relay RW7. A circuit also extends from wires 50 and 52 to the hold coil of relay RW7. Closure of contacts RW7*b* will complete a circuit via wire 53 to energize the second pick coil of end delay relay RW8 and this relay will hold until the column 2 L.V.S. contacts transfer under vacuum conditions. A circuit is now completed from line 47 (Fig. 2*d*), wire 54, contacts RW8*c*, now closed, normally closed contacts RW17*f*, RD11BL, RW3*e*, to the A clamp coils 39 and line 48. A circuit also extends from the RD11BL contacts, the normally closed contacts RW9*a*, the pick and hold coils of relay RW9 and line 48. Energization of the A clamp coils will activate clamp A to hold the tape against the fixed guide 17.

Clamp A will be on whenever column 2 is in an atmospheric state, however, means are provided to prevent clamp A from coming on until approximately 10 to 15 milliseconds after the column 2 L.V.S. contacts transfer to their atmospheric condition to allow time for the overshoot of tape to settle back in column 1. The RW7P and RW7H coils are connected in such a manner that the resultant flux will be zero with equal currents flowing in each of them. This is exactly what happens when the column 2 L.V.S contacts transfer to their atmospheric condition. As the capacitor 51 builds up a charge, the current in the RW7P coil subsides but the current in the RW7H coil remains the same. The RW7H coil will produce enough flux to pull the armature of the relay and close the RW7*b* contacts to effect the energization of relay RW8 and the A clamp coils, as previously described. At the same time the RW8*a* contacts open to release the RW7P coil and capacitor 51 will discharge through a resistor 55 and the now closed RW8*b* contacts. The delay circuit is made adjustable through the resistors 56, 57 and is generally set at approximately 10 milliseconds.

With the A clamp on, the load-unload switch (Fig. 2*b*) is now placed in the load position and a circuit is completed from line 47, through the switch, the normally closed RW6*c* contacts, the hold coil of initial condition relay RD3 and line 48. This results in the completion of a circuit from line 47, wire 58, the now closed contacts RD3AL, the pick coils of relays RHD3, RHD4, RHD5, RHD8, RHD9, the hold coil of RW1 and line 48. The energization of these relays brings into operation the various motors of the machine for supplying air, vacuum, drive for the tape reels and drive for the rotor assembly.

Referring to Fig. 2*a*, circuits are now completed from the phase 1 terminal 59 of the power supply, now closed contacts RHD3*a* and *b*, the vacuum turbine motor 60 and the ground terminal 61. Also, from the phase 2 terminal 43, now closed contacts RHD5*a* and *b*, the vacuum turbine motor 62 and the ground terminal 61. As a result, vacuum will now be supplied to column 2 through the valve 34 and to column 3 in steady state. Circuits are also completed from the phase 3 terminal 40 through the now closed contacts RHD8*a* and *b* to the reel drive motor 63, and through the now closed contacts RHD9*a* and *b* to another reel drive motor 64. The reel drive motors 63, 64 are geared for driving both the feed reel and the take-up reel in a clockwise direction to feed the tape when the reels are clutched in. A circuit is also completed from the phase 1 terminal 59, wire 65, through the now closed contacts RHD4*a* and *b* to the blower motor 66 and back to the phase 3 terminal 40. The blower motor drives a turbine, the inlet of which provides vacuum in column 1 and the exhaust circulates air through the machine for cooling purposes. Air pressure for the fixed tape guides 15, 16, 17 and 19 is supplied from a suitable air compressor, not shown.

The energization of relay RW9 through the pick circuit for the A clamp coils results now in the completion of a circuit from line 47 (Fig. 2*b*), wire 67, the now closed contacts RW1*b*, the now closed contacts RW9*c*, the pick coil of rotor motor relay RHD6 and the hold coil of relay RW2, and line 48. These relays will hold through the RW2*a* and RW1*b* contacts. Referring back to Fig. 2*a*, a circuit is now completed from the phase 3 terminal 40, contacts RHD6*a* and *b*, now closed, the rotor motor 68, coil of relay RMR and ground connection 69. Contacts RMR*a* will now close to complete the circuit through the start winding 70 of the rotor motor putting the motor in operation to rotate the rotor assembly 11.

Thus far, the tape has been loaded on the feed reel, rotor assembly and take-up reel, vacuum has been established in columns 1 and 3, air pressure supplied to the tape guides, the rotor assembly put into rotation and the reel drive motors activated. Before the machine can progress into a running operation, however, it is necessary to preload tape into column 1 and column 3 and for this purpose there is provided a preload motor 71 (Fig. 2*a*). The preload motor may be switched to run in a forward direction for the purpose of loading tape into columns 1 and 3 or to run in a reverse direction to remove tape from these columns. The preload motor is geared directly to the feed reel and take-up reel shafts through a feed reel brake and take-up reel brake such that with the preload motor running in a forward direction and the brakes energized the feed reel will be driven in a clockwise direction and the take-up reel in a counterclockwise direction. Reverse rotation of the preload motor will reverse the direction of the reels.

Figure 2B:
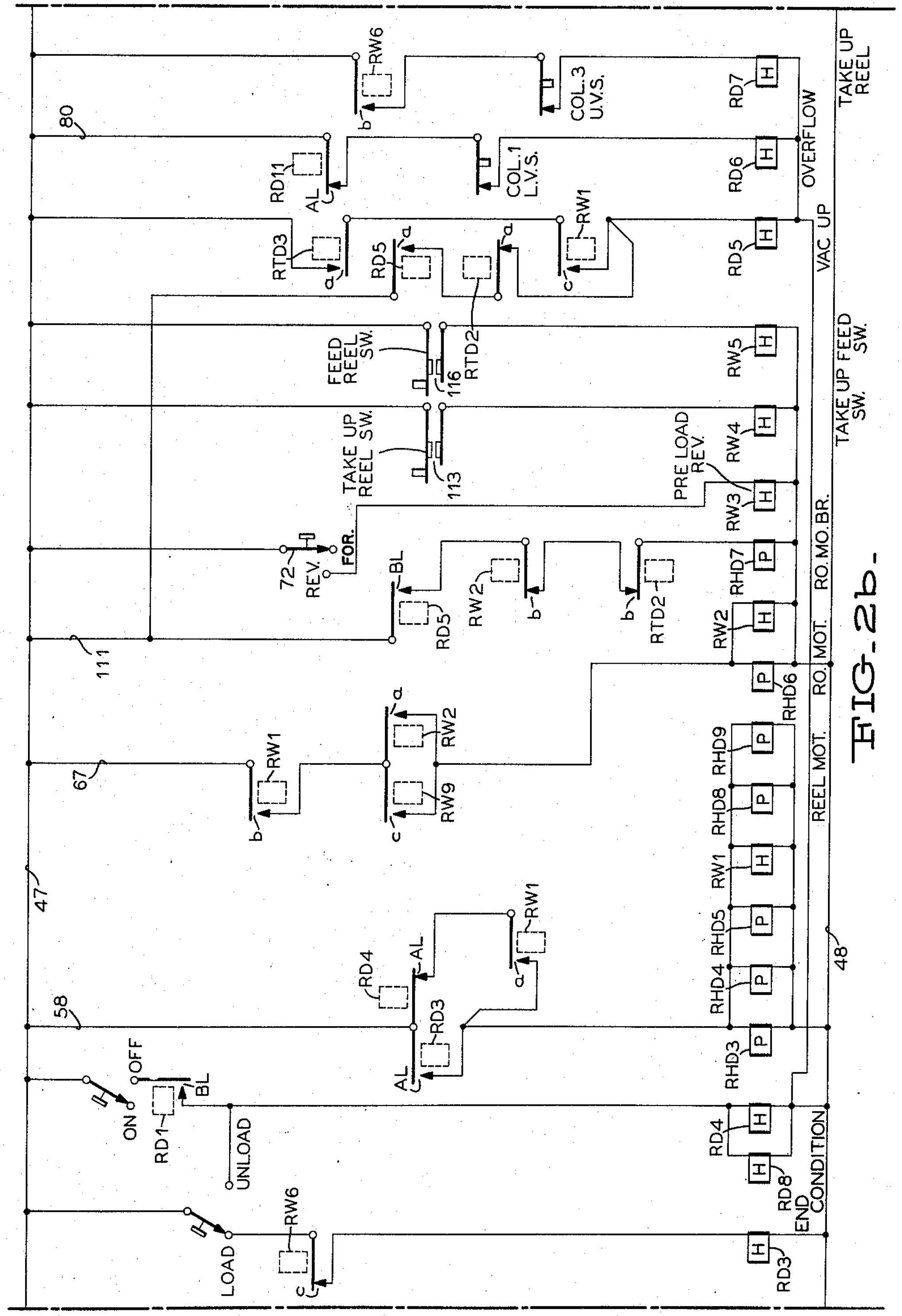

The preloading of columns 1 and 3 is accomplished by placing the manual switch 72 (Fig. 2*b*) in the forward position thereby opening the circuit to preload reverse relay RW3 and by connecting the manual switch 73 (Fig. 2*a*) to the normally closed RD6AU and BU contacts. Referring to Fig. 2*b*, overflow relay RD6 was energized with power on the lines 47, 48; however, vacuum has been established in column 1 causing the column 1 L.V.S contacts to open and drop out relay RD6. Consequently, a circuit may now be completed from phase 2 terminal 43, wire 74, closed contacts RD6BU, closed side of switch 73, the preload motor 71 and ground terminal 61. Also, from phase 1 terminal 59, wire 75, closed contacts RD6AU, closed side of switch 73, the preload motor and ground terminal 61. The preload motor is thus activated in the forward direction. Now, referring to Fig. 2*c*, a circuit is completed from line 47, wire 76, normally closed side of contacts RW17*c*, normally closed contacts RD11*a*, the now closed contacts RD3AU, normally closed contacts RW3*d*, the take-up reel brake coils 77 and line 48. Also, a circuit extends from line 47, wire 78, normally closed contacts RD11*b*, the now closed contacts RD3BL, normally closed contacts RW17*b*, the feed reel brake coils 79 and line 48. Driving connections have now been established and the feed and take-up reels will commence to feed tape into columns 1 and 3.

The tape loops will feed into columns 1 and 3 until the tape in column 1 passes below the lower vacuum switch L.V.S. thus exposing it to the atmosphere which results in closure in the column 1 L.V.S. contacts. As a result, a circuit is now completed from line 47 (Fig. 2*b*), wire 80, normally closed contacts RD11AL, closed column 1 L.V.S. contacts, the hold coil of relay RD6 and line 48. The RD6AU and BU contacts will now open to drop out the preload motor 71 and stop the feed and take-up reels. Contacts RD6BU (Fig. 2*c*) will close to keep the feed reel brake coils energized and the contacts RD6BL will open to prevent energization of the feed reel drive clutch coils 81. The take-up reel brake coils 77 will remain energized through either the RD7B or RD3AU contacts.

After the tape has been properly preloaded, the run switch 82 (Fig. 2*c*) may be closed to effect the energization of a run relay RW6. The circuit previously completed through the RHD5*a* and *b* contacts (Fig. 2*a*) also extends through the coil of a time delay relay RTD3 and effects energization of a relay RD5 (Fig. 2*b*) through the now closed contacts RW1*c*, RTD3*a* and line 47. A circuit is then completed from line 47 (Fig. 2*c*), run switch 82 closed, normally closed contacts RW5*a*, the now closed contacts RD5AL, the hold coil of run relay RW6 and line 48. At this time, the B clamp coils (Fig. 2*d*) will be energized by a circuit which extends from line 47, wire 83, the now closed contacts RW6*b*, normally closed contacts RW11*d*, the B clamp coils 84 and line 48. The tape is now ready to feed from column 1, around the rotating rotor and head assembly and into column 2 as soon as clamp A is released.

Clamp A is on whenever column 2 is in an atmospheric state and it will be released when feed relay RW16 is energized. Relay RW16 will be energized when the machine is in a run mode, clamp B is on, the read delay time has expired, and providing the tape is below the column 1 upper vacuum switch U.V.S. When the A clamp coils 39 were energized an auxiliary circuit was completed from the RD11BL contacts through the normally closed contacts RW9*a* to energize the pick coil of relay RW9. The relay RW9 hold coil will hold through the RD11BL, RW17*f* and RW8*c* contacts. Similarly, when the clamp B coils 84 are energized an auxiliary circuit extends through the normally closed contacts RW10*a* to energize the pick coil of relay RW10. Relay RW10 will hold through the RW11*d* and RW6*b* contacts.

With the energization of relay RW9, a circuit is now completed from line 47 (Fig. 2*e*), wire 85, the now closed contacts RW9*e*, the normally closed contacts RW15*a*, the 2P coil of read delay RW14 and line 48. The circuit extends also through the RW15*a* contacts, capacitor 86, the P coil of relay RW14 and line 48. The RW14 delay circuit functions in the same manner as the previously described delay circuit for relay RW7 and is set for approximately 25 milliseconds by means of the adjustable resistors 87, 88. The purpose of the read delay relay RW14 is to provide time for the tape to be read by the rotating heads while tape is being dumped from column 2 and also to prevent more tape from being fed into column 2 until the read delay of 25 milliseconds is complete. At the completion of the delay a circuit is completed from line 47, wire 89, the now closed contacts RW14*a*, the normally closed contacts RW15*c* the P and 2P coils of end read delay relay RW15 and line 48. The 2P coil of RW15 will hold through the now closed RW15*d* contacts and the normally closed RD9AL contacts.

The end of the read delay has been indicated and the tape is now ready to be fed to position a new section around the rotor. At this time, then, a circuit is completed from line 47, wire 90, the now closed contacts RW6*d*, now closed contacts RW10*b*, now closed contacts tacts RW14*b*, now closed column 1 upper vacuum switch contacts U.V.S., closed contacts RW16*a*, the pick and hold coils of feed relay RW16 and line 48. Feed relay RW16 will hold through contacts RW16*b*, RW10*b* and RW6*d*. A circuit also extends from the RW14*b* contacts to the pick coil of vacuum valve relay RD13 and the hold coil of column 2 vacuum up relay RD9. The energization of relay RD13 completes a circuit from line 47, wire 91, now closed contacts RD13*a*, the vacuum valve coils 92 and line 48. The vacuum valve coils 92 operate the valve 34 to create a vacuum in column 2. The vacuum in column 2 will cause the column 2 lower vacuum switch to transfer and a circuit will now be completed from line 47 (Fig. 2*d*), wire 49, the normally open side of column 2 contacts L.V.S., now closed, the now closed contacts RW16*c*, the A unclamp coils 93 and line 48. The transfer of the column 2 L.V.S. contacts in a vacuum state will also result in the drop out of relays RW7, RW8, RW9, RW14, RW15 and RW16.

With vacuum in column 2 and clamp A released, the tape will now feed out of column 1, around the rotating rotor and into column 2. As the tape passes below the column 2 lower vacuum switch L.V.S., the switch will become exposed to the atmosphere resulting in the transfer of its contacts again. This will result in the energization of the A clamp coils again, by the circuits previously described, to prevent more tape from feeding into column 2. The tape in column 2 will be drawn against the sides of the column and the surface of the lower profile 29 by the time the activation of clamp A becomes effective, thus resulting in a precise measured increment of tape feed. Relay RW9 is again energized to close the RW9*e* contacts (Fig. 2*e*) to energize the read delay relay RW14, as previously described.

Since tape was fed out of column 1 and into column 2, it bceomes necessary to feed more tape into column 1 in order to maintain a slack loop and this operation is under control of the overflow relay RD6 and the column 1 lower vacuum switch, shown in Fig. 2*b*. When the tape in column 1 is pulled above the lower vacuum switch, the switch becomes exposed to vacuum and the column 1 L.V.S. contacts will open to drop out relay RD6. As a result, contacts RD6BU (Fig. 2*c*) open to disable the feed reel brake and contacts RD6BL close to complete a circuit through the normally closed RD8*a* contacts and the now closed RW6*e* contacts to energize the feed reel drive clutch coils 81. Accordingly, the feed reel shaft will be connected with the reel drive motors and tape will be fed by the feed reel into column 1. When the tape loop passes below the lower vacuum switch, indicating that sufficient tape has been fed, the switch contacts will close to energize relay RD6 thereby activating the feed reel brake and de-energizing the feed reel drive clutch coils.

During the time that clamp A is activated and the section of tape supported around the rotor assembly is being scanned, the tape loop measured in column 2 is dumped into column 3 preparatory to the feeding of a new section of tape to the rotor assembly. The dumping operation is accomplished by switching column to an atmospheric condition and releasing clamp B. The operation starts by the completion of a circuit from line 47 (Fig. 2*d*), wire 49, the normally closed side of column 2 L.V.S. contacts, wire 94, now closed contacts RD9BU, now closed contacts RW9*b*, column 3 L.V.S. contacts, which are closed as long as the tape in column 3 does not pass below the lower vacuum switch, the normally closed contacts RW11*a*, the pick coil of dump duration relay RW11 and line 48. Relay RW11 will hold through the normally closed RW13*e* contacts and the now closed RW11*b* contacts.

The energization of relay RW11 will now complete a circuit from line 47 (Fig. 2*e*), wire 95, the now closed contacts RW11*e*, the pick coil of atmosphere valve relay RD12 and line 48. This results in a circuit which extends from line 47, wire 96, the now closed contacts RD12*a*, atmosphere valve coils 97 and line 48. Energization of coils 97 will operate valve 34 to place column 2 in an atmospheric condition. At the same time, a circuit is completed from line 47 (Fig. 2*d*), wire 98, the now closed contacts RW11*c*, B unclamp coils 99 and wire 48. Thus, the B clamp will be released and the tape will dump from column 2 into column 3 under the influence of the vacuum in column 3.

The energization of relay RW11 will also complete a circuit from line 47 (Fig. 2*c*), wire 100, the now closed contacts RW11*c*, normally closed contacts RW12*b*, capacitor 101, the pick coil of dump delay relay RW19 and line 48. The hold coil of relay RW19 also picks and holds through the RW11*c* contacts. The pick of relay RW19 is delayed in the same manner as was previously described for relays RW7 and RW14 with this delay being set for 30 milliseconds through the adjustable resistors 102, 103. Referring to Fig. 2*d*, a circuit may now be completed from line 47, wire 104, the now closed contacts RW19*a*, normally closed contacts RW13*a*, capacitor 105, the pick coil of dump delay relay RW12 and line 48. The hold coil of relay RW12 also picks and holds through the RW19*a* contacts. The pick of relay RW12 is similarly delayed for 30 milliseconds making a total delay of 60 milliseconds for the dumping operation.

After the 60 millisecond delay, which insures that the tape has had sufficient time to dump from column 2 into column 3 and is up tight against the upper profile 28 in column 2, relay RW12 energizes and a circuit is completed from line 47 (Fig. 2*d*), wire 106, the now closed contacts RW12*a*, the hold coil of end dump relay RW13 and line 48. Now a circuit is completed from line 47, wire 107, the now closed RW13*f* contacts, the hold coil of single cycle relay RW18 and line 48. Relay RW13 holds through the RW13*c* and RD9BL contacts. Energization of relay RW13 will open contacts RW13*e* to drop out relay RW11 and as a result the B clamp coils are again energized through contacts RW11*d* and RW6*b*. Relay RW10 is energized along with the B clamp coils and contacts RW10*b* (Fig. 2*e*) will close to complete a circuit to relay RD13. Now contacts RD13*a* will close to energize the vacuum valve coils 92 and column 2 will be switched to a vacuum state.

The column 2 upper and lower vacuum switches transfer, the A unclamp coils are energized and another feed cycle follows, as previously described.

The tape is reeled out of column 3 onto the take-up reel under control of the column 3 upper vacuum switch. Referring to Fig. 2*b*, when the tape in column 3 passes below the upper vacuum switch the switch will be exposed to the atmosphere and the column 3 U.V.S. contacts will close to complete a circuit from the closed RW6*b* contacts to energize the hold coil of take-up reel relay RD7. As a result, contacts RD7B (Fig. 2*c*) will open to drop out the take-up reel brake coils 77 and also a circuit will be completed from line 47, wire 108, the now closed contacts RD7AU, normally closed contacts RD8BU, the take-up reel drive clutch coils 109 and line 48. Accordingly, the take-up reel will feed tape out of column 3. When the tape feeds up past the upper vacuum switch, the switch contacts will transfer to an open position to drop out the relay RD7 causing contacts RD7AU to open the circuit to the take-up reel drive clutch coils. At the same time a circuit is completed from line 47, wire 76, the normally closed side of contacts RW17*c*, normally closed contacts RD11*a*, the now closed contacts RD7B, normally closed contacts RW3*d*, the take-up reel brake coils 77 and line 48.

Figure 2C:
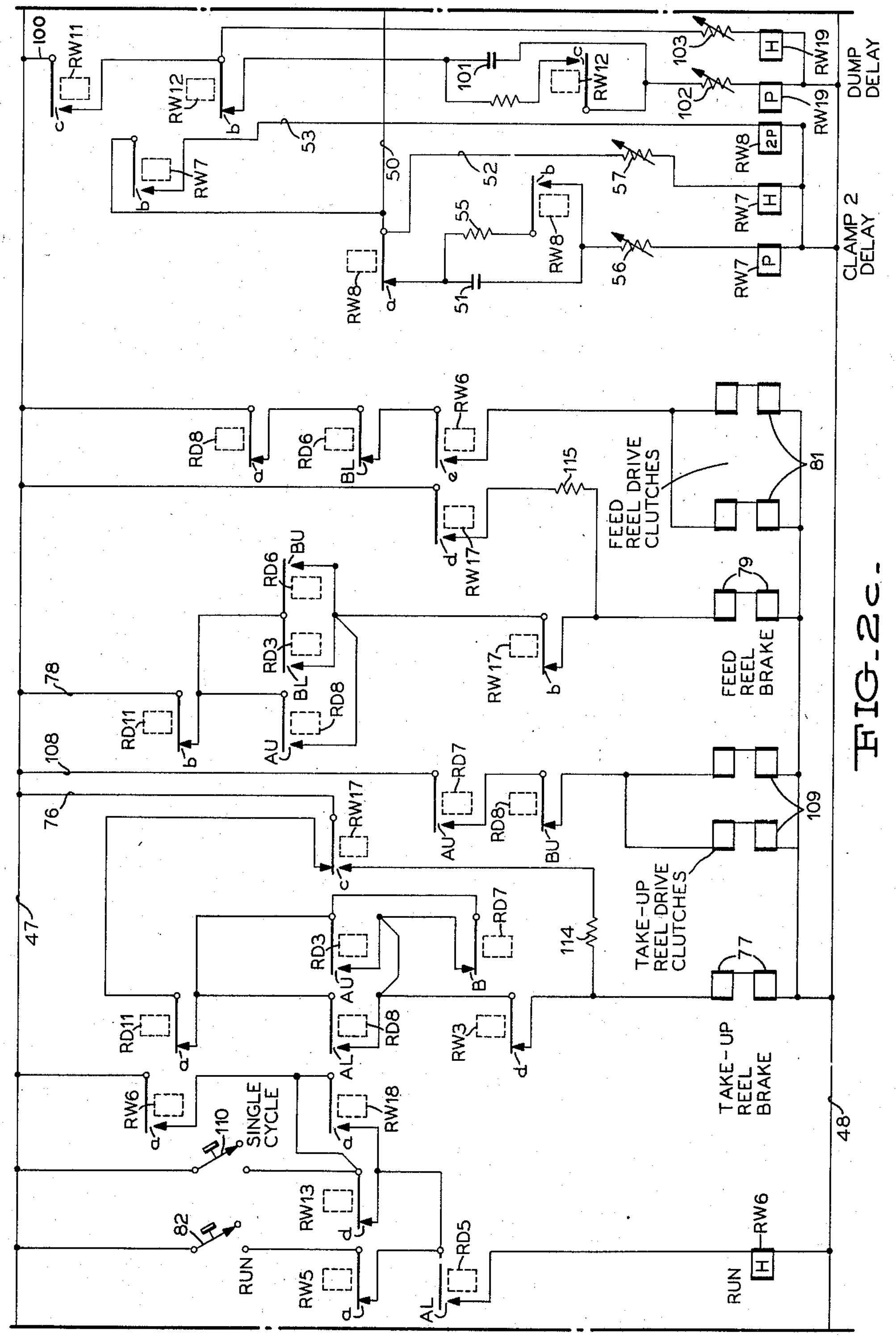
Figure 2D:
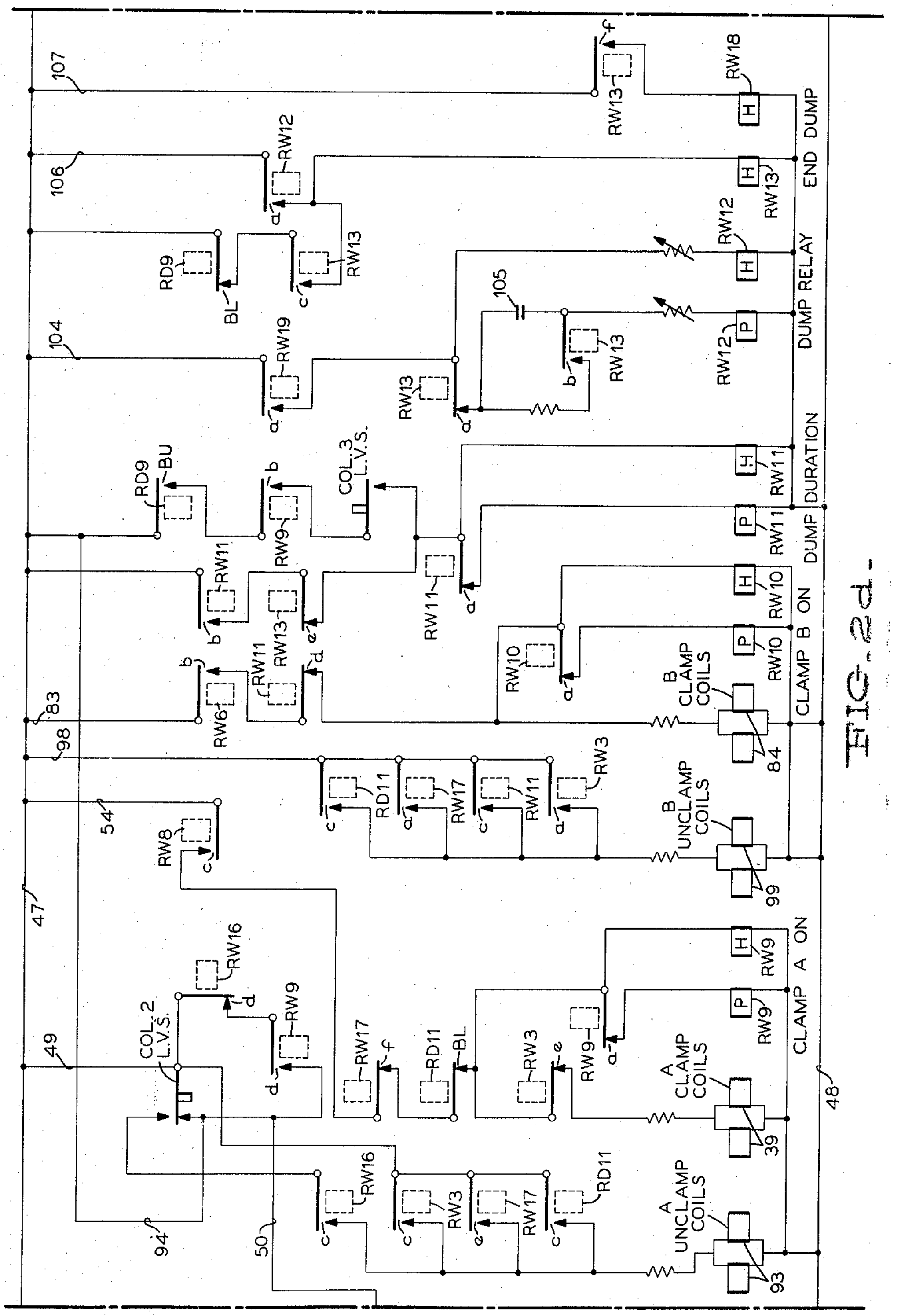

Tape can also be made to feed into column 2 and dumped into column 3 on a single cycle basis by depressing and releasing the single cycle key 110 (Fig. 2*c*). The run key 82 is opened and depression of the single cycle key 110 will complete a circuit through the normally closed RW13*d* contacts, contacts RD5AL, closed as long as the vacuum supply is on, the run relay RW6 and line 48. Run relay RW6 will hold through the RW13*d* contacts until relays RW13 and RW18 are energized. After energization of relays RW13 and RW18, the RW6 hold circuit will extend through the now closed RW18*a* contacts and the closed RW6*a* contacts. Energization of relay RW6 will initiate the feed circuits as previously traced and feeding on a single cycle basis will continue as long as the single cycle key is held depressed.

To end operation of the machine, the load-unload switch (Fig. 2*b*) is placed in the unload position to effect energization of the end condition relays RD4 and RD8. As a result, the RD4AL contacts will open to drop out the various motor relays RHD3, RHD4, RHD5, RW1, RHD8 and RHD9. Contacts RD8AL (Fig. 2*c*) close to complete a circuit to the take-up reel brake coils 77 and the RD8BU contacts open to disable the take-up reel drive clutch. Similarly, the contacts RD8AU close to call in the feed reel brake and the RD8*a* contacts open to disable the feed reel drive clutch.

Also, referring to Fig. 2*a*, the power switch PS is moved to the off position and this results in the energization of a time delay relay RTD1 through the still closed RD1AL contacts. Another time delay relay RTD2 is also energized through the still closed RD5AU contacts and the now closed RD4BU contacts. The purpose of these relays is to keep the D.C. power supply on for approximately an additional five seconds in order to supply power for braking the rotor assembly. The braking is accomplished by completing a circuit at this time which extends from line 47 (Fig. 2*b*), wire 111, closed contacts RD5BL, RW2*b* and RTD2*b*, the pick coil of relay RHD7 and line 48. Referring back to Fig. 2*a*, the RHD7*a* contacts now close to apply D.C. power to the rotor motor winding to brake the rotor assembly and prevent undue coasting. At the end of the five second time extension, the delay relays RTD1 and RTD2 are fully energized and contacts RTD1*a* contacts open to drop out relays RD1 and RD2. This results in the opening of contacts RD2AU to disable the 48 volt D.C. supply. Also, referring to Fig. 2*b*, contacts RTD2*b* now open to drop out relay RHD7 and the RTD2*a* contacts open to drop out relay RD5.

After the machine has stopped, a rewind operation may be performed if it is desired to rewind the tape back onto the feed reel. Before rewinding, the manual switch 73 (Fig. 2*a*) is connected to the now closed contacts RD4AU and BU thus completing circuits to the preload motor 71 and causing the motor to run in a reverse direction whereby the feed reel will be driven counterclockwise to pull tape up out of columns 1 and 3. The switch 72 (Fig. 2*b*) should be switched to the reverse terminal to cause the energization of preload reverse relay RW3. This causes the RW3*d* contacts to open and disable the take-up reel brake so that the reel will be free during the reverse operation of the preload motor and the feed reel. This will avoid tape breakage which would occur if both reels were positively driven in opposite directions.

Figure 2E:
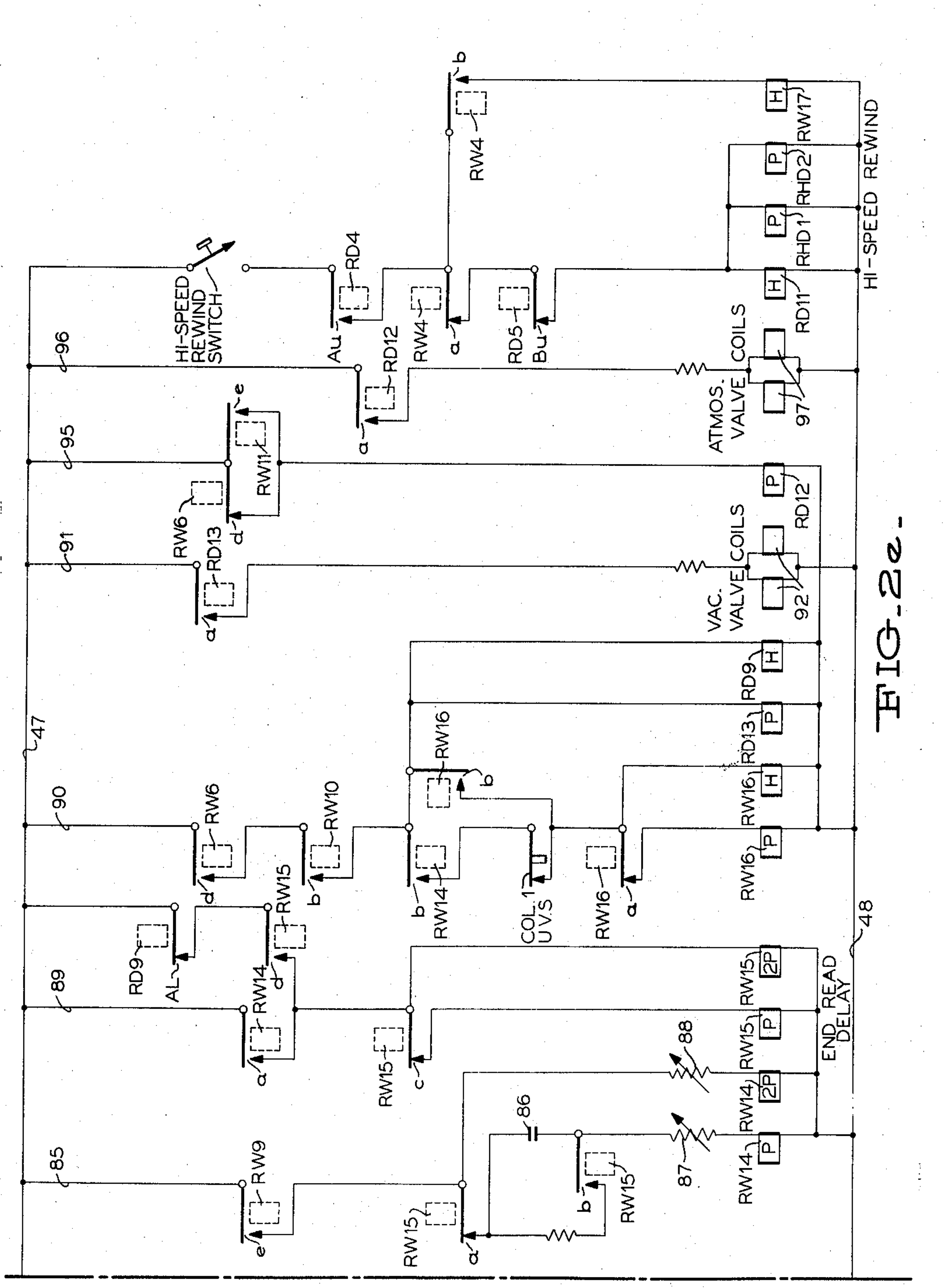

Referring to Fig. 2*e*, a rewind operation is then initiated by closing a high speed rewind switch to complete a circuit through the now closed RD4AU contacts, the normally closed RW4*a* contacts, the closed RD5BU contacts, the hold coil of relay RD11, the pick coils of rewind motor relays RHD1 and RHD2 and line 48. Referring to Fig. 2*c*, contacts RD11*a* open to disable the take-up reel brake and contacts RD11*b* open to disable the feed reel brake. Also, referring to Fig. 2*d*, contacts RD11*c* and RD11*a* close to energize the A and B unclamp coils thus freeing the tape for movement. A rewind motor 112 (Fig. 2*a*) is energized by circuits extending from the phase 1 terminal 59 and the now closed contacts RHD1*a* and *b*, and from the phase 2 terminal 43 and the now closed contacts RHD2*a* and *b*. The rewind motor is suitably connected to the feed reel shaft and drives the feed reel in a counterclockwise direction to rewind the tape.

When the take-up reel becomes empty at the end of a rewind operation, a microswitch 113 is actuated to complete a circuit from line 47 (Fig. 2*b*), microswitch 113 contacts, the hold coil of relay RW4 and line 48. Contacts RW4*a* now open to disable the rewind motor circuit and contacts RW4*b* close to energize the hold coil of relay RW17 (Fig. 2*e*). Referring to Fig. 2*d*, contacts RW17*c* and RW17*a* close to maintain the A and B unclamp coils energized even though relay RD11 has dropped out. Also, the take-up reel brake is now energized through the normally open side of contacts RW17*c*, now transferred and a resistor 114 and the feed reel brake is energized through the now closed contacts RW17*d* and resistor 115. Since the reels are traveling at high speed on a rewind operation, the resistors 114, 115 are provided to ease the braking action when stopping them.

A microswitch 116 is also provided which is controlled by the tape on the feed reel. If the feed reel runs out of tape, the microswitch 116 is operated to complete a circuit extending from line 47, closed microswitch 116 contacts, the hold coil of relay RW5 and line 48. Under this condition, the RW5*a* contacts (Fig. 2*c*) will open the circuit to the run relay RW6 to disable the machine.

The rewind relays RD11, RHD1, RHD2 and RW17 will drop out upon the opening of the rewind switch at the end of the rewind operation and the end condition relays RD4 and RD8 will drop out when the load-unload switch is placed in the load position to start a new tape run. The preload switch 73 is transferred to the RD6AU and BU contacts preparatory to another preload operation in the forward direction. It is understood that the tape may be manually preloaded into columns 1 and 3 if the use of a preload motor is not desired.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A tape handling system including a tape upon which information is processed, comprising a tape feed reel connected to one end of said tape, a tape take-up reel spaced from said feed reel and attached to the other end of said tape, a rotating drum positioned intermediate said feed and take-up reels and including means for processing information on said tape, means for positioning at rest around a portion of said drum a section of tape to be processed, tape storage means intermediate said feed reel and drum, means for operating said feed reel to store a section of tape in said storage means, a second tape storage means intermediate said drum and take-up reel, means for placing said second storage means in a vacuum state to move tape out of said first storage means, around said drum, and into said second storage means, and means controlled by said second storage means for stopping movement of said tape.

2. A tape handling system as in claim 1 and including adjustable means in said second storage means for controlling the increment of tape that can be fed into said second storage device.

3. A tape handling system as in claim 1 and including a third tape storage means intermediate said second storage means and said take-up reel, means for switching said second storage means from a vacuum state to an atmospheric state, and means for placing said third tape storage means in a vacuum state to dump tape from said second storage means into said third storage means.

4. A tape handling system as in claim 1 and including a third stage storage means intermediate said second tape storage means and said take-up reel, means for switching said second storage means from a vacuum state to an atmospheric state, means for placing said third tape storage means in a vacuum state to dump tape from said second storage means into said third storage means, and means for operating said take-up reel to remove tape from said third storage means.

5. A tape handling system including a tape upon which information is processed, comprising a tape feed reel connected to one end of said tape, a tape take-up reel spaced from said feed reel and attached to the other end of said tape, a rotating drum positioned intermediate said feed and take-up reels and including means for processing information on said tape, tape storage means intermediate said feel reel and drum, a second tape storage means intermediate said drum and take-up reel, means for positioning around a portion of said drum a section of tape to be processed, tape clamping means between said drum and said second storage means, means for operating said clamping means to maintain said positioned section of tape at rest, means for operating said feed reel to store a section of tape in said first storage means, means for placing said second storage means in a vacuum state, and means controlled by said second storage means when in a vacuum state for releasing said clamping means whereby tape will be moved out of said first storage means, around said drum, and into said second storage means, and further controlled by tape in said second storage means for operating said clamping means to stop movement of said tape.

6. A tape handling system including a tape upon which information is processed, comprising a tape feed reel connected to one end of said tape, a tape take-up reel spaced from said feed reel and attached to the other end of said tape, a rotating drum positioned intermediate said feed and take-up reels and including means for processing information on said tape, tape storage means intermediate said feed reel and drum, a second tape storage means intermediate said drum and take-up reel, means for positioning around a portion of said drum a section of tape to be processed, tape clamping means between said drum and said second storage means, means for operating said clamping means to maintain said positioned section of tape at rest, means for operating said feed reel to store a section of tape in said first storage means, means for placing said second storage means in a vacuum state, and a vacuum switch controlled by said second storage means when in a vacuum state for releasing said clamping means whereby tape will be moved out of said first storage means, around said drum, and into said second storage means, said switch effective, when exposed to the atmosphere, for operating said clamping means to stop movement of said tape.

7. A tape transport system for moving tape from a feed reel, around a rotating scanning disc and onto a take-up reel, comprising a first tape pocket for receiving tape from said feed reel, a second tape pocket for receiving tape from said scanning disc, a third tape pocket for receiving tape from said second pocket, means for operating said feed reel to form a slack loop of tape in said first pocket, means for placing said second pocket in a vacuum state to draw tape from said first pocket around said scanning disc and into said second pocket, means for removing said vacuum and stopping said tape to position a section of tape at rest around said disc, means for dumping tape from said second pocket into said third pocket, and means for operating said take-up reel to remove tape from said third pocket.

8. A tape transport system for moving tape from a feed reel, around a rotating scanning disc and onto a take-up reel, comprising a first tape pocket for receiving tape from said feed reel, a second tape pocket for receiving tape from said scanning disc, a third tape pocket for receiving tape from said second pocket, means for operating said feed reel to form a slack loop of tape in said first pocket, means for placing said second pocket in a vacuum state to draw tape from said first pocket around said scanning disc and into said second pocket, switch means in said second pocket and operated by the tape in said second pocket to remove said vacuum, clamping means operated by said switch means for stopping said tape to position a section of tape at rest around said disc, means for dumping tape from said second pocket into said third pocket, and means for operating said take-up reel to remove tape from said third pocket.

9. A tape transport system as in claim 8 wherein said second pocket includes an adjustable lower profile for predetermining the length of tape advance around said disc.

10. In a tape transport system for moving tape from a feed reel, around a rotating scanning disc and onto a take-up reel, a tape pocket for receiving a loop of tape from said scanning disc, an upper profile for said pocket and perforated to expose said pocket to the atmosphere, a lower profile in said pocket and perforated to expose said pocket to a vacuum source, said profiles determining the upper and lower limits of travel of said tape loop, means for placing said tape loop at its upper limit against the upper profile to seal said pocket from the atmosphere, means for operating said vacuum source to draw said tape loop down against said lower profile thereby advancing tape around said scanning disc, clamping means for stopping the advancement of tape around said disc, a vacuum switch in said pocket near said lower profile, and means controlled by said vacuum switch when exposed to the atmosphere for operating said clamping means.

11. A tape transport system as in claim 10 and including means under control of said scanning disc for adjusting said lower profile vertically to maintain equal increments of tape feed around said disc.

12. A tape transport system for moving tape from a feed reel, around a rotating scanning disc and onto a take-up reel, comprising a first tape pocket for receiving tape from said feed reel, a second tape pocket for receiving tape from said scanning disc, a third tape pocket for receiving tape from said second pocket, a first clamping means preventing advancement of said tape around said disc, a second clamping means preventing the advancement of tape from said second pocket into said third pocket, means for operating said feed reel to form a slack loop of tape in said first pocket, means for placing said second pocket in a vacuum state, vacuum switch means in said second pocket for releasing said first clamping means allowing said vacuum to draw tape from said first pocket around said scanning disc and into said second pocket, means controlled by the tape in said second column for exposing said switch means to the atmosphere, means controlled by said switch means when exposed to the atmosphere for operating said first clamping means to position a section of tape at rest around said disc, means for returning said second pocket to an atmospheric state, means for placing said third pocket in a vacuum state, means for releasing said second clamping means to allow tape to be drawn from said second pocket into said third pocket, switch means operated by tape in said third pocket for operating said second clamping means to stop further transfer of tape, and means controlled by said last switch means for operating said take-up reel to remove tape from said third pocket.

References Cited in the file of this patent

UNITED STATES PATENTS

| | | |
|---|---|---|
| 2,648,589 | Hickman | Aug. 11, 1953 |
| 2,778,634 | Gams et al. | Jan. 22, 1957 |
| 2,792,217 | Weidenhammer et al. | May 14, 1957 |
| 2,814,676 | House | Nov. 26, 1957 |
| 2,815,907 | McCormick | Dec. 10, 1957 |
| 2,849,531 | Stiles | Aug. 26, 1958 |